United States Patent [19]
Geyer

[11] 3,876,408
[45] Apr. 8, 1975

[54] CONNECTIONS BETWEEN GLASS AND SILICON OR SILICON CARBIDE

[75] Inventor: Karl Heinz Geyer, Munich, Germany

[73] Assignee: Siemens Aktiengesellschaft, Berlin and Munich, Germany

[22] Filed: May 31, 1973

[21] Appl. No.: 365,484

[30] Foreign Application Priority Data
June 21, 1972 Germany............................ 2230298

[52] U.S. Cl. ............................ 65/36; 65/32; 65/43; 65/59; 264/60
[51] Int. Cl. ...................... C03b 23/20; C03c 27/00
[58] Field of Search ............... 65/32, 36, 47, 37, 54, 65/59, 43; 264/60; 51/308

[56] References Cited
UNITED STATES PATENTS

| | | | |
|---|---|---|---|
| 1,732,287 | 10/1929 | Simonds | 51/308 |
| 2,977,206 | 3/1961 | Sheets | 51/308 |
| 3,244,948 | 4/1966 | Cooper | 65/59 X |
| 3,266,526 | 8/1966 | Berg | 65/36 X |
| 3,408,222 | 10/1968 | Navias | 65/43 X |
| 3,482,149 | 12/1969 | Duke | 264/6 UX |
| 3,634,111 | 9/1969 | Foster et al. | 65/43 |
| 3,672,858 | 6/1972 | Berg | 65/59 X |
| 3,833,348 | 9/1974 | Stokes et al. | 65/374 |

Primary Examiner—S. Leon Bashore
Assistant Examiner—Frank W. Miga
Attorney, Agent, or Firm—Hill, Gross, Simpson, Van Santen, Steadman, Chiara & Simpson

[57] ABSTRACT

An improved technique for producing connections between crystalline silicon or silicon carbide components and glass components so as to produce gas-tight connections between such different components. The resulting connections can not only support a mechanical load, but also are resistant to high temperatures. The glass used has a linear coefficient of thermal expansion which differs from that of the silicon or silicon carbide by not more than about 20%.

7 Claims, 9 Drawing Figures

3,876,408

CONNECTIONS BETWEEN GLASS AND SILICON OR SILICON CARBIDE

BACKGROUND OF THE INVENTION

The production of tubes or wafers from silicon or silicon carbide is well known. Silicon and silicon carbide withstand high temperatures and are resistant to the attack of chemically agressive substances. A valuable additional property of silicon is its marked optical filter effect. If tubes or wafers of silicon carbide are to be used, for example, in chemical apparatus employing the vacuum technique, or in opto-electronic devices, the problem arises of joining these components to other parts of the devices in gas-tight or vacuum-tight fashion. Up to the present time, force-locking or form-locking connections have generally been used for this purpose. The force-locking connections include seals using a sealing material subject to pressure, such as, for example, rubber or synthetic resin material, and force and form-locking connections include tapered ground surfaces, which must generally be sealed using some form of grease. Form-locking connections can be obtained, for example, by casting a hardenable synthetic resin material round the joint. However, none of these connections fulfils the requirement of being at the same time adequately sealed and also resistant to high temperatures. Furthermore, many of these connections cannot support a mechanical load, in particular at high temperatures, without a reduction in the efficiency of the seal. Seals produced by melting processes, such as welding or soldering, are also known, but not, however, with silicon or silicon carbide.

Fused metal-glass unions are already well known. In fused unions of this kind, the requirement exists that the linear coefficients of thermal expansion of the metal on the one hand, should differ from one another by a maximum of ± 10 % in the most unfavorable case. A greater deviation in the thermal expansion coefficient is permissible only when the glass is subjected to pressure or when the metal component is in itself elastic and can therefore absorb the stresses which occur during heating or cooling at the point of fusion.

BRIEF SUMMARY OF THE INVENTION

The present invention relates to the production of gas-tight connections for crystalline silicon or silicon carbide components.

It is an object of the present invention to provide a method of producing a gas-tight connection to or for a silicon or silicon carbide component which connections can support a mechanical load and is resistant to high temperatures.

It is another object to provide fusion products formed between preshaped silicon or silica carbide bodies and preshaped glass bodies which can support a mechanical load and which are resistant to elevated temperatures.

Other and further objects, purposes, features, advantages, and utilities will be apparent to those skilled in the art from a reading of the present specification, drawings and claims.

DETAILED DESCRIPTION

Figure 1:
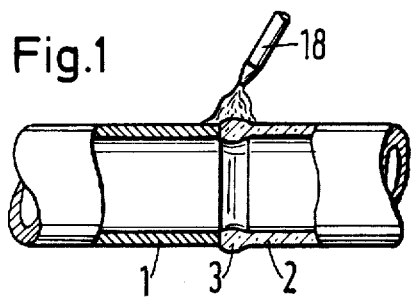
FIG. 1 is a side elevational, diagrammatic view, some parts thereof in section, illustrating the method of the present invention being applied to prepare a butt joint between a tube of silicon or silicon carbide and a tube of glass.

Referring to FIG. 1, there is seen a tubular component 1 made of silicon or silicon carbide being joined in gas-tight fashion to a tubular glass body 2. The components 1 and 2 have approximately the same diameter and the same wall thickness. The end glass body 2 is fused onto the end component 1 using a burner 18, by heating the glass body to its melting temperature. A fusion zone 3 is thus formed in glass body 2. Preferably the burner 18 supplies an oxidizing flame, i.e. operates with an excess of oxygen because this favors the formation of silicon dioxide on the surface of the component 1 and ensures a good bond or connection between the component 1 and the glass body 2. Since silicon dioxide is characteristically present on silicon and silicon carbide in atmospheric air, the glass body 2 can also be fused to the component 1 using electrically generated heat. However, removal of the layer of silicon dioxide located on the surface of the component 1 must be avoided. Heat for fusing and melting the glass body, can be produced by any convenient means, for example, by inductive heating, by resistance heating, by dielectric heating, by radiation heating, or the like.

Figure 2:
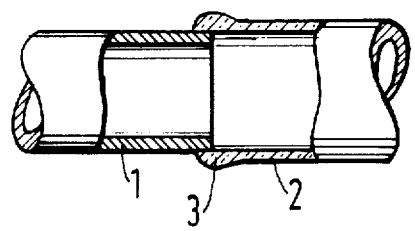
FIG. 2 is a side elevational, diagrammatic view, some parts thereof in section, of a lapp joint between a tube of silicon or silicon carbide and a tube of glass.

In FIG. 2, the tubular glass body 2 has a somewhat larger diameter than the tubular component 1 and is adapted to telescopically fit over the end of component 1. Component 1 is here formed of silicon or silicon carbide. The inside end of the glass body 2 is fused, for example, preferably using an oxidizing flame, onto the outside end of the tubular component 1. The fusion zone is indicated by the numeral 3.

Figure 3:
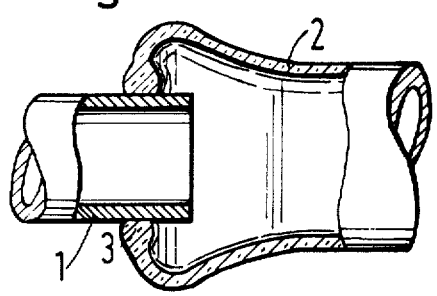
FIG. 3 through FIG. 6 are views similar to FIG. 2 but showing various other joints between various shapes of silicon or silicon carbide and various shapes of glass.
Figure 4:
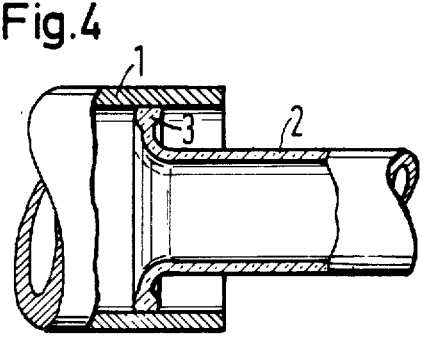

In each of FIGS. 3 and 4, a tubular glass body 2 has a flared terminal region ending in edges adapted to abut against a circumferential face of component 1 adjacent the end thereof. Component 1 is here formed of silicon or silicon carbide. The fusion zone is indicated by numeral 3. The glass body 2 is here fused to component 1 from either the outside or the inside, respectively, as the case may be, to form a butt joint on the wall of each tubular component 1.

Figure 5:
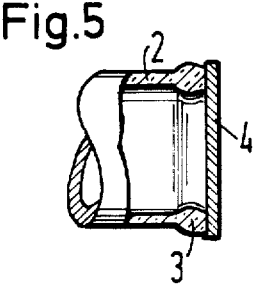

FIG. 5 illustrates the connection of a disc-shaped component 4 composed of silicon or silicon carbide across the end of a tubular glass body 2. Here, the glass body 2 is fused onto one of the two opposed flat sides of the disc-shaped component 4, the fusion zone being indicated by numeral 3.

Figure 6:
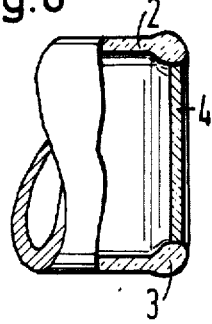

FIG. 6 illustrates fusion of a tubular glass body 2 to the circumferential edges of the disc-shaped component 4, composed of silicon or silicon carbide, the fusion zone being indicated by numeral 3.

The respective dimensions of either a component made of silicon or silicon carbide, or of a glass body component to be joined thereto, are completely noncritical, as those skilled in the art will readily appreciate. Component diameter, wall thickness, and the like, may be selected as desired, so that, for example, one may utilize the known configurations, elements, and the like of glass apparatus technology. In general, the component made of glass (herein sometimes termed the glass body) are each preferably preformed into a desired shape before being used in the present invention; however, as those skilled in the art will appreciate, some slight forming of such a preshaped glass body may take place in the fusion process of this invention particularly in the fusion zone of the glass body adjacent the silicon or silicon carbide component. Preferred glass, silicon or silicon carbide preformed components used in the present invention are in the form of conduits, such as tubes and the like, particularly since such components are commonly occuring elements to be joined or connected together, and preferred joints are of the butt or lapp type, similarly because such interconnections are commonly convenient and desirable to make.

By way of glass types, borosilicate glasses generally can be used in glass bodies for fusing with silicon or silicon carbide components. Aluminoborosilicate glasses can be used for silicon components. In general, at temperatures in the range from ambient conditions up to about 300°C., the linear coefficient of thermal expansion of the glass used a particular body should not differ by more than about ±20% that of silicon, or of silicon carbide, as the case may be. Particularly, the linear coefficient of thermal expansion for such glass should not differ by more than about ±5 × $10^{-7}$cm/°C. from that of silicon, nor by more than about ± 12 × $10^{-7}$cm/°C. from that of silicon carbide, as the case may be. Depending somewhat upon their individual composition, the glass component used in any given instance is fused to the silicon or silicon carbide component at a temperature generally in the range of from about 900° to 1100°C. although higher and lower temperatures may sometimes be employed, as those skilled in the art will appreciate. Also, as those skilled in the art appreciate, the melting point of a glass can, if desired, be reduced in known manner, by additives to the glass during manufacture thereof, for example, by addition of lead components, but the preparation of suitable glasses for use in this invention is known to the art and does not constitute a part of the present invention.

As indicated above, silicon dioxide is present on the surface of the component formed of silicon or silicon carbide. The quantitative amount of silicon carbide needed on the surface of such component in the region where such surface is to be fused to a glass body is very small and is difficult to estimate in a general manner owing to inherent variations between silicon, silicon carbide, and glass components, respectively, which one may desire to fuse together in accordance with the teachings of the present invention. While silicon dioxide inherently forms on silicon and silcon carbide surfaces exposed to oxygen containing air or gas, and while the silicon dioxide so formed is believed to be in a layered form, perhaps monomolecular in thickness, such layer may be discontinuous in some places and thicker than a single molecule in other places all over an extremely short distance taken along the surface of a given component of silicon or silicon dioxide. In general the silicon dioxide present is integrally associated with the silicon or silicon carbide and is in the form of particles in the angstrom (A). In general the amount of silicon dioxide present on the surface of such a component in the region of contacting between such component and a glass body is sufficient to result in bonding between the glass body and such component during the fusing operation.

To facilitate connection (fusion of a glass body to a silicon or silicon carbide component) such a component expediently can be coated with glass of the same composition as the glass body before fusing of the glass body to the component. Such a coating can be accomplished by any convenient technique, for example, by winding a glass fiber around the component, or by coating the component with a fluid suspension containing such a glass, followed subsequently heating the component to the melting point of the glass.

Connnections between silicon or silicon carbide components and glass bodies produced by the teachings of this invention can frequently be used in devices in which at least one part thereof consists of silicon or silicon carbide. For example, tubular wall components, or disc-shaped windows, in optical, or optoelectrical, or optoelectronic devices can be provided to permit the introduction or omission of infra-red radiation whose wavelength is greater than that of the absorption edge of silicon. Such devices include, for example, incandescent lamps, photo-cells, photo-elements, thermoelements, bolometers, television camera tubes and the like. Moreover, one may use a silicon component as a radiation window in X-ray tubes.

Connections between a glass body and a component of silicon or silicon carbide can also be advantageously used in applications where it is desired to make use of the high heat conductivity and the resistance to chemically aggressive substances associated with silicon or silicon carbide. Examples of such applications include coolers, heat-exchangers, e.g. for use with aqua regia, and the like.

Connections between glass and silicon or silicon carbide can advantageously also be used in diffusion vessels for the doping of silicon wafers to be subsequently used for the production of semiconductor components. In such diffusion vessels and the processes using same, it is important that the materials which come into contact with the silicon wafers which are to be doped have a similar degree of purity to the latter. Silicon or silicon carbide is predominantly suitable for this purpose. Moreover, silicon and silicon carbide have a high melting point, so that a device made of these materials does not soften at the high temperatures of between 1000° and 1300 °C. required for diffusion. The connection between the silicon or silicon carbide and the glass produced by this invention is vacuum-tight, so that no damaging substances can penetrate into the interior of the diffusion vessel during the diffusion process.

Figure 7:
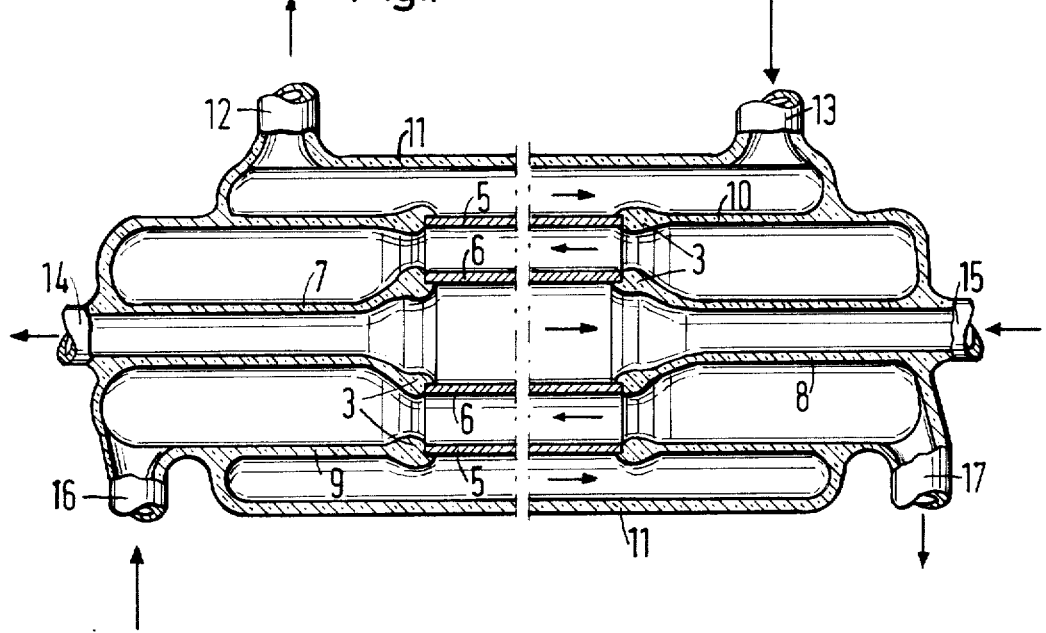
FIG. 7 is a vertical sectional view of a first device utilizing the present invention.

Referring to FIG. 7, there is seen a side-sectional view of a heat-exchanger for use with aggressive materials in which connections between silicon or silicon carbide components and glass bodies are employed. Thus, the heat-exchanger has an outer tube 5 and an inner tube 6, each made of silicon or silicon carbide. To the opposite ends of tube 5 are fused glass tubes 9 and 10, respectively, and to the opposite ends of the tube 6 are fused glass tubes 7 and 8, respectively. The fusion zones are indicated by numeral 3. To the glass tubes 9 and 10 are fused a glass tube 11 which forms an outer casing for the heat-exchanger. The glass tube 11 is provided with two tubular connections 12 and 13. The glass tube 9 is provided with a tubular connection 16, and the glass tube 10 a tubular connection 17. The tube 7 terminates in an outlet opening 14 and the tube 8 in an inlet opening 15. The aggressive medium which is to be cooled, e.g. aqua regia, is introduced through the inlet opening 15. The coolant, e.g. water, is introduced through the connections 13 and 16, and leaves through the connections 12 and 14. Since silicon possesses a relatively high heat conductivity (it is approximately 130 times greater than that of glass), there is a rapid cooling or heating of the fluid which is to be cooled or heated through regions having silicon or silicon carbon components.

Figure 8:
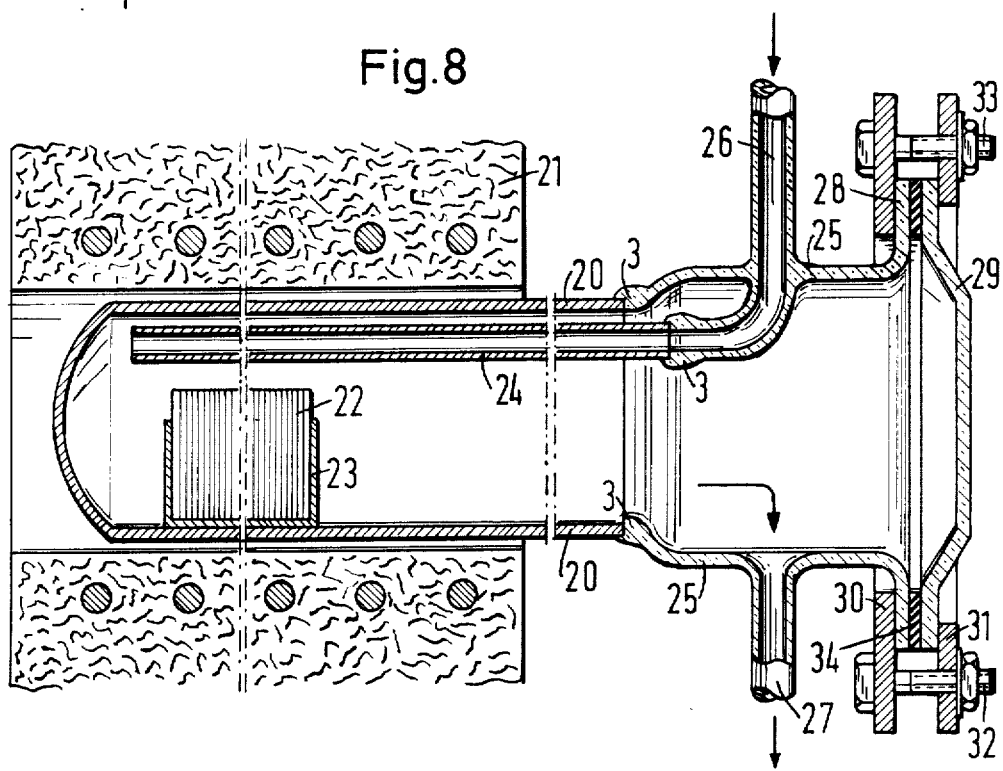
FIG. 8 is a vertical sectional view of another device utilizing the present invention.

FIG. 8 shows a side-sectional view of an arrangement for the doping by diffusion of semiconductor wafers. This arrangement comprises a tube 20 made of silicon or silicon carbide, which partially extends into a diffusion furnace 21 and is closed at its end within the furnace. Semiconductor wafers 22 which are to be doped are accommodated in the tube 20, and are held in a grating 23 which also consists of silicon or silicon carbide. The dopant, e.g. gaseous phosphorus pentoxide mixed with a carrier gas, is led into the tube 20 through a further tube 24 also made of silicon or silicon carbide. A glass tube 25 is fused to the open end of the tube 20, and a glass tube 26 is fused to the end of the tube 24. The fusion zones are indicated by numeral 3. The gaseous dopant passes out of the tube 20 through a tubular connection 27 fused to the glass tube 25. To facilitate the loading of the diffusion vessel (i.e. the tube 20) with semiconductor wafers, the glass tube 25 is provided with a flange 28 at its open end, on which is placed an annular seal 34, and a cover 29 which may also, for example, consist of glass. The cover 29 is pressed onto the flange 28 by means of outer rings 30 and 31 composed for example, of steel or the like, and bolted together by means of bolts 32, 33, or the like. The tube 25 may be fused to the cover 29.

Figure 9:
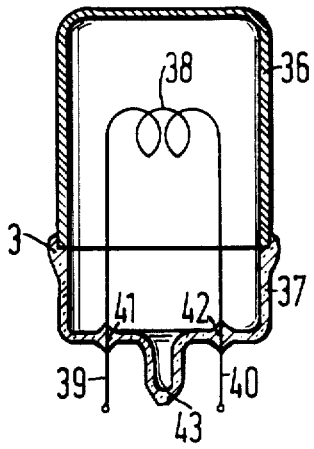
FIG. 9 is a vertical sectional view of a further device utilizing the present invention.

FIG. 9 shows a side-sectional view of an infra-red lamp. The lamp has an envelope 36 which is made of silicon. This envelope is fused at its open end to a base 37 which is made of borosilicate glass or an iluminoborosilicate glass. The fusion zone is indicated at 3. Inside the lamp there is arranged a coil 38, the terminals 39, and 40 of which are led through the base of the lamp via two openings 41 and 42, respectively. The base of the lamp has a pump connection 43 through which the interior of the lamp can be evacuated. Because of the filtering effect of the silicon, the lamp gives out only radiation in the infra-red range.

The tubes of silicon which are used for the illustrated devices can be produced in known manner, for example, by the thermal decomposition of, for instance, silicochloroform, $SiHCl_3$, in the presence of molecular hydrogen and consequent deposition of silicon on a graphite body heated to a temperature of between 1050°and 1250°C. The silicochloroform decomposes at the heated surface of the carrier body into silicon and hydrogen chloride. The deposition is continued until the desired layer thickness is reached. Then, after cooling, the graphite body is withdrawn.

Tubes consisting of silicon carbide can be produced similarly in known manner, for example, by the thermal decomposition of methyldichlorosilane, or methyltrichlorosilane, in the presence of hydrogen. In this case, the required deposition temperature lies in the range of 1200° to 1600°C. In this case, too, a carrier body of graphite may be employed. The deposition must take place in the absence of oxygen, since otherwise the graphite body would burn.

Other and further embodiments and modifications within the spirit and scope of the present invention will be apparent to those skilled in the art from a reading of the present specification and drawings and no undue limitations are to be associated therewith.

I claim:

1. A method of producing a gas tight, load bearable, high temperature resistant bond between two shaped bodies comprising the steps of
    A. directly contacting a surface of a preformed component comprised of a material selected from the group consisting of crystalline silicon and crystalline silicon carbide with a surface of a preformed glass body comprised of a material selected from the group consisting of borosilicate glasses, said glass body having a linear coefficient of thermal expansion which differs from that of said component by not more than about ±20% at temperatures ranging up to about 300° C.
    B. heating said glass body and said component in air at the region of said contacting surfaces to a temperature and for a time sufficient to cause localized melting of said glass body and to produce a layer of silicon dioxide on the contacting surface of said component, and
    C. fusing said molten glass body contacting surface with said component contacting surface to produce bonding between said contacting surfaces.

2. A method as claimed in claim 1, wherein said component is made of silicon, and said glass body is made of an aluminoborosilicate glass.

3. The method of claim 1 wherein said component is comprised of silicon carbide and said glass body is comprised of an aluminoborosilicate glass.

4. The method of claim 1 wherein said component is in the form of a conduit and said region of contacting is substantially at an end thereof.

5. The method of claim 1 wherein said component is in the form of a conduit and said region of contacting is substantially adjacent an end thereof.

6. The method of claim 4 wherein said glass body so contacted with said component is in the form of a conduit having a cross-sectional configuration at one end thereof, approximating that of said component at said end thereof and said respective ends are abutted together to form a butt-type joint therebetween.

7. The method of claim 5 wherein said glass body so contacted with said component is in the form of a conduit having a cross-sectional configuration at one end thereof which is adapted to engage side wall portions of said component to form a lapp-type joint therebetween.

* * * * *